US006361864B1

United States Patent
Fan et al.

(10) Patent No.: US 6,361,864 B1
(45) Date of Patent: *Mar. 26, 2002

(54) METHOD FOR MAKING HIGH-EFFICACY AND LONG LIFE ELECTROLUMINESCENT PHOPHOR

(75) Inventors: Chen-Wen Fan, Sayre; Richard G. W. Gingerich, Towanda; Dale E. Benjamin, Athens, all of PA (US)

(73) Assignee: Osram Sylvania Inc., Danvers, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/243,674

(22) Filed: Feb. 2, 1999

Related U.S. Application Data

(60) Provisional application No. 60/087,739, filed on Jun. 20, 1998.

(51) Int. Cl.[7] ......................... C09K 11/65; C09K 11/08; B32B 9/00
(52) U.S. Cl. ............... 428/403; 428/404; 252/301.4 R; 427/64; 427/212; 427/215; 427/217
(58) Field of Search ................................ 428/404, 403; 427/64, 66, 68, 69, 70, 212, 215, 217; 252/301.4 R, 301.5, 301.6 R, 301.4 S, 301.4 P, 301.4 F, 301.4 H, 301.4, 301.6, 301.6 P, 301.6 S, 301.6 F

(56) References Cited

U.S. PATENT DOCUMENTS 4,363,998 A * 12/1982 Graff et al. ................. 313/487
4,585,673 A * 4/1986 Sigai ........................... 427/213
5,080,928 A    1/1992 Klinedinst et al. ............ 427/70
5,188,763 A * 2/1993 Chenot et al. ........... 252/301.5
5,294,867 A * 3/1994 Grossman ................... 313/490
5,469,019 A * 11/1995 Mori ........................... 313/509
5,605,867 A * 2/1997 Sato et al. .................. 438/790
5,666,031 A * 9/1997 Jennato et al. ............... 315/246

FOREIGN PATENT DOCUMENTS

DE    19849581    4/1999    ........... C09K/11/02
EP    0455401     4/1991    ........... C09K/11/02

OTHER PUBLICATIONS

Webster's Third New International Dictionary, p. 732, 1961.*

* cited by examiner

Primary Examiner—Shrive P. Beck
Assistant Examiner—Michael Cleveland
(74) Attorney, Agent, or Firm—William H. McNeill

(57) ABSTRACT

A method of coating phosphor particles by chemical vapor deposition. The phosphors are coated by introducing an inert gas into a reaction vessel; charging phosphor particles into the reaction vessel; heating the reaction vessel to a reaction temperature; introducing a coating precursor which includes carbon into the reaction vessel for a time sufficient to saturate the phosphor particles with the precursor; continuing precursor flow into the reaction vessel; introducing an oxygen/ozone mixture into the reaction vessel, the oxygen/ozone mixture comprising less than 4.4 wt. % ozone; and maintaining the inert gas flow, oxygen/ozone mixture flow and further precursor supply for a time sufficient to coat the phosphor particles. The process produces phosphors having from 2200 to 6300 ppm of carbon on the coating and provides lamp efficacy's of greater than 6.1 lm/watt.

2 Claims, No Drawings

METHOD FOR MAKING HIGH-EFFICACY AND LONG LIFE ELECTROLUMINESCENT PHOPHOR

This application claims the benefit of Provisional Application Serial No.: 60/087,739, filed Jun. 20, 1998.

CROSS-REFERENCE TO RELATED APPLICATIONS

Ser. No. 09/177,226, filed Oct. 22, 1998, now abandoned, and claiming priority from Ser. No. 60/087,697, filed Jun. 2, 1998, and Ser. No. 09/153,978, filed Sep. 16, 1998, now abandoned, and claiming priority from Ser. No. 60/065,950, filed Oct. 27, 1997 contain related subject matter. The disclosures of both are assigned to the assignee of the present invention and the teachings thereof are hereby incorporated by reference.

TECHNICAL FIELD

This invention relates to coated particles and more particularly to particles having a conformal coating thereon. More particularly, this invention relates to phosphors and still more particularly to electroluminescent phosphors having thereon a coating that protects the phosphor from moisture absorption and greatly increases the life and efficacy.

BACKGROUND ART

Coated phosphors are known from U.S. Pat. Nos. 4,585, 673; 4,825,124; 5,080,928; 5,118,529; 5,156,885; 5,220, 243; 5,244, 750; and 5,418,062. It is known from some of the just-mentioned patents that a coating precursor and oxygen can be used to apply a protective coating. See, for example, U.S. Pat. Nos. 5,244,750 and 4,585,673. The coating processes in several of the others of these patents employ chemical vapor deposition to apply a protective coating by hydrolysis. Additionally, the above-cited U.S. patent application Ser. No. 09/153,978, filed Sep. 16, 1998, now abandoned, discloses a method for coating phosphor particles by chemical vapor deposition and using an oxygen/ ozone reactant. The latter process operates in the absence of water or water vapor. The above-cited U.S. patent application Ser. No. 09/177,226, filed Oct. 22, 1998, now abandoned, discloses an improvement to the oxygen/ozone process which further increases the life and efficacy by first saturating the phosphor with a precursor before beginning the deposition. It would be a still further advance in the art to increase the efficacy and the life of such coated phosphors even more.

DISCLOSURE OF INVENTION

It is, therefore, an object of the invention to obviate the disadvantages of the prior art.

It is another object of the invention to enhance the operation of coated phosphors.

Yet another object of the invention is the provision of a phosphor coating method that does not employ water or water vapor.

These objects are accomplished, in one aspect of the invention, by a method of coating phosphor particles with the steps comprising: introducing an inert gas into a reaction vessel; charging phosphor particles into said reaction vessel; heating said reaction vessel to a reaction temperature; introducing a coating precursor which includes carbon into said reaction vessel for a time sufficient to saturate said phosphor particles with said precursor; continuing precursor flow into said reaction vessel; introducing an oxygen/ozone mixture into said reaction vessel, said oxygen/ozone mixture comprising less than 4.4 wt. % ozone; and maintaining said inert gas flow, oxygen/ozone mixture flow and further precursor supply for a time sufficient to coat said phosphor particles.

It has been found that, when during the above-cited process, the ozone generator is operated at far less than maximum efficiency and the coating precursor contains carbon, a phosphor particle will be produced having a coating which contains from about 2200 to about 6300 ppm carbon. These phosphor particles, when used to manufacture electroluminescent lamps, provide lamps having efficacies in the range of 6.1 to 7.7 lumens/watt, far in excess of the 3.3 lumens/watt of the control.

BEST MODE FOR CARRYING OUT THE INVENTION

For a better understanding of the present invention, together with other and further objects, advantages and capabilities thereof, reference is made to the following disclosure and appended claims.

Referring now to the invention with greater particularity, there is provided a method for preparing high-efficacy and long-life electroluminescent (EL) phosphors by coating such phosphors from an organic, metal containing precursor such as trimethyl aluminum (TMA). The method employs chemical vapor deposition to deposit the coating on individual phosphor particles and particularly concerns coating the phosphors in a manner to include in the coating substantial amounts of carbon.

EXPERIMENTAL PROCEDURE

An inert nitrogen gas stream, which bypasses the TMA bubbler, (5.0 liter/minute flow rate) was first flowed into the bottom of an empty, 4 inch diameter quartz tube which is used as the fluidized bed reactor. 10.0 kg of copper-doped zinc sulfide (ZnS:Cu) electroluminescent phosphor, such as Sylvania Type 728, available from Osram Sylvania Products Inc., Towanda, PA, was charged in the quartz tube, which has a length of 36 inches. The phosphor particles were suspended by the stream of nitrogen gas in the fluidized bed reactor with a bed height of about 18 inches. A vibromixer was turned on and operated at a speed of 60 cycles /minute and the bed was heated to a temperature of approximately 180° C. by an external furnace. A thermocouple positioned at the middle of the powder be was used to control the reactor temperature within ±3° C. during the coating process. When the temperature approaches 180° C., a TMA pretreatment step was initiated with nitrogen gas flowing through the TMA bubbler at 2.0 liters/minute. The TMA bubbler is kept at a temperature of 34° C. and maintains a constant TMA vapor pressure. The second nitrogen gas stream containing the vaporized TMA coating precursor was mixed with the 5.0 liters/minute nitrogen gas stream that bypassed the TMA bubbler and flowed into the base of the fluidized bed reactor. This dilute TMA precursor vapor passed through a metal frit located under the tube reactor and used to support the phosphor particle bed. After the surfaces of the phosphor particles were saturated with the TMA precursor for 10 minutes, oxygen gas with a flow rate of 16.5 liter/minute was passed through a Model GL-1 ozone generator manufactured by PCI Ozone & Control Systems, Inc. The ozone production rate of the generator was controlled by varying the DC current to the inverter. With various ozone output rate settings, different amounts of ozone gas were produced from the ozone generator. The oxygen/ozone mixture was flowed into the reactor through a series of holes circumferentially located on the hollow shaft of the vibromixer, above the vibrating disc, to start the coating process. The final product was collected at the end of the coating experiment (about 70 hours) for chemical analyses and lamp evaluation.

EXAMPLE

Four coating tests were conducted to study the effect of carbon concentration of coated EL Phosphor on lamp performance. The concentration of carbon incorporated into the coating layer was affected by the concentration of ozone in the coating environment. The ozone concentration was controlled by varying the DC current to the inverter, as noted above. The concentration was measured by a Series #400 ozone monitor manufactured by PCI. A constant oxygen flow rate of 16.5 liters/minute (at 15 psig) was passed through the ozone generator for all the experiments. The test results are incorporated in Table I.

TABLE I

| | | Carbon | | Lamp Performance | | | | |
| | | | | Light Output (Ft. L) | | | Difference | Efficacy |
| Sample | % $O_3$ | ppm | % Al | 24 Hrs | 100 Hrs | 500 Hrs | Life Hours | Lm/w |
| --- | --- | --- | --- | --- | --- | --- | --- | --- |
| Base | | 150 | | | | | | 3.3 |
| TH 9 | 4.3 | 2200 | 4.4 | 22.2 | 21.7 | 18.0 | 2276 | 6.1 |
| TH 13 | 4.3 | 2300 | 4.3 | 22.0 | 21.4 | 17.5 | 2118 | 6.2 |
| TH 14 | 3.0 | 4400 | 4.4 | 19.8 | 19.5 | 16.5 | 2283 | 6.4 |
| TH 15 | 2.0 | 6300 | 4.0 | 19.0 | 18.8 | 15.8 | 2348 | 7.7 |

The Base sample is an uncoated zinc sulfide:copper EL phosphor. The amount of carbon shown is a residual contaminant. The next two samples, TH9 and TH13, represent a control wherein the ozone generator was run at its highest position as directed by the prior art. This position represented about 100% of capacity. The average concentration of ozone gas was about 4.3%. In accordance with an aspect of the invention, for the next sample, TH14, the ozone output control was set at 65%, which resulted in generating 3.0 wt. % of ozone gas. The last test, TH15, kept the ozone concentration constant at 2 wt. % with the ozone output control set at 38%. The coated phosphors were submitted for total carbon, aluminum, BET, particle size analysis and lamp testing, with the results shown in Table I All of the coated samples performed well in lamps, with efficacies in excess of 6.1 lm/watt and 24 hour light output above 19 foot lamberts. Based on the chemical analysis and lamp tests, the two separate control runs, TH9 and TH13 were duplicated very well. Both samples contained about 2200 ppm carbon on the coating and this thin film improved the efficacy of the EL lamps from 3.3 about 6.2 lm/watt. By reducing the ozone concentration from 4.3 to 3.0 wt. %, the carbon concentration of TH14 was increased significantly to 4400 ppm. The higher concentration of carbon improves the efficacy and life slightly. When the ozone concentration decreased to 2.0 wt. % in TH15, the resulting coating had 6300 ppm carbon. The half-life of TH15 was slightly better than that of TH14, but the efficacy was improved to 7.7 lm/watt. A significant improvement was achieved.

Thus, it is clear that the efficacy and life properties of EL lamps are enhanced by incorporating significant amounts of carbon species to the metal-containing coating layer.

While there have been shown and described what are at present considered the preferred embodiments of the invention, it will be apparent to those skilled in the art that various changes and modifications can be made herein without departing from the scope of the invention as defined by the appended claims.

What is claimed is:

1. A coated, electroluminescent phosphor comprising; a central core of a base electroluminescent phosphor material surrounded by a coating that inhibits moisture absorption and increases the life expectancy and efficacy of said coated electroluminescent phosphor when compared to said base electroluminescent phosphor and wherein said coating contains from about 2200 to about 6300 ppm carbon.

2. The coated electroluminescent phosphor of claim 1 wherein said base phosphor has an efficacy of about 3.3 lumens per watt and said coated phosphor has an efficacy of 6.1 to 7.7 lumens per watt.

* * * * *